US006941465B1

(12) United States Patent
Palekar et al.

(10) Patent No.: US 6,941,465 B1
(45) Date of Patent: Sep. 6, 2005

(54) METHOD OF ENFORCING A POLICY ON A COMPUTER NETWORK

(75) Inventors: Ashwin Palekar, Redmond, WA (US); Bernard D. Aboba, Bellevue, WA (US); Narendra C. Gidwani, Kirkland, WA (US); Michel Guittet, Redmond, WA (US); Todd L. Paul, Snohomish, WA (US); David L. Eitelbach, Seattle, WA (US); Stephen E. Bensley, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/360,912

(22) Filed: Jul. 26, 1999

(51) Int. Cl.$^7$ .............................................. H04L 9/00
(52) U.S. Cl. ...................... 713/200; 713/201; 713/202; 713/150; 713/153
(58) Field of Search ............................... 713/200–202, 713/150, 153–155, 162, 166–167, 1, 100; 709/217–219, 709/223–225; 707/9, 10

(56) References Cited

U.S. PATENT DOCUMENTS

| 6,041,347 | A | * | 3/2000 | Harsham et al. ............ 709/220 |
| 6,070,244 | A | * | 5/2000 | Orchier et al. .............. 713/201 |
| 6,163,536 | A | * | 12/2000 | Dunn et al. .................. 370/352 |
| 6,182,142 | B1 | * | 1/2001 | Win et al. .................... 709/229 |
| 6,192,361 | B1 | * | 2/2001 | Huang ............................ 707/9 |
| 6,339,830 | B1 | | 1/2002 | See et al. |
| 6,470,453 | B1 | * | 10/2002 | Vilhuber ....................... 713/201 |
| 6,493,749 | B2 | * | 12/2002 | Paxhia et al. ................ 709/220 |

OTHER PUBLICATIONS

Aboba, Bernard. "Lightweight Directory Access Protocol (v3): Dynamic Attributes for the Remote Access Dialin User Service (RADIUS)" (Nov. 19, 1997). Accessed at http://nutibara.udea.edu.co/pub/draft-abaoba-dynradius-01.txt on Jan. 21, 2000.
"Virtual Motion: Advanced Communication Technologies." World Wide Web pages available at www.virtualmotion.com. Accessed on Feb. 4, 1999.
C. Rigney et al.; Remote Authentication Dial in User Service (RADIUS); Apr. 1997; pp. 1-65.
Deborah Estrin et al.; Visa Protocols for Controlling Inter-Organizational Datagram Flow: Extended Description; Dec. 1988; 41 pp.; WRL Research Report 88/5; Western Research Laboratory, Palo Alto, California.
David L. Wasley; Authenticating Aperiodic Connections to the Campus Network; Jun. 1996; 9 pp; Regents of the University of California.
Howard Weiss; Verdix security system; Sep. 4, 1999; 5 pp.
Jeff Hayes; 802.1 Minutes (Jun. 2, 1999); Jun. 7, 1999; 5 pp.
Andrew Smith; DRAFT Minutes of IEEE 802.1 Montreal meeting; Jul. 19, 1999; 8 pp.

(Continued)

Primary Examiner—Hosuk Song
(74) Attorney, Agent, or Firm—Amin & Turocy, LLP

(57) ABSTRACT

A policy server program evaluates one or more policy statements based on the group or groups to which a user belongs as well as other conditions. Each policy statement expresses an implementation of the access policy of the network, and is associated with a profile. The profile contains one or more actions that are to be applied to the user. The policy server program determines the identity of the group or groups to which the user belongs by referencing one or more group attributes contained in a user object which is located in a directory on the network. The user object and its group parameters are established when the user is added to the directory, while a policy statement for a group can be created at any time.

23 Claims, 7 Drawing Sheets

OTHER PUBLICATIONS

Mick Seaman; Advance notice of proposed 802.1 PAR : Port based network access control; Jun. 8, 1999; 5 pp.

Norm Finn, VLAN Truck Protocol; Mar. 9, 1999; 11 pp.

Cisco IOS Lock and Key Security; 1996; 6 pp.; Cisco Systems, Inc.

CableLabs, press release; Cable Industry agrees on key elements of digital systems specifications; Oct. 3, 1996; 3 pp:.

Daniel Farmer et al.; The Cops Security Checker System, Purdue University Technical Reports CDS-TR-993; Jan. 22, 1994 (orginally appearing in the proceedings of the Summer Usenix Conference, 1990, Anaheim CA); 14 pp.

Frederick M. Avolio; A Network Perimeter With Secure External Access; Jan. 25, 1994: 11 pp.; Trusted Information Systems, Incorporated, Glenwood, MD.

* cited by examiner

METHOD OF ENFORCING A POLICY ON A COMPUTER NETWORK

TECHNICAL FIELD

The invention relates generally to computer network administration and, more particularly, to a method of enforcing a policy on a computer network.

BACKGROUND OF THE INVENTION

With the growing popularity of computer networking and the growth of large computer networks, it is becoming increasingly necessary for network administrators to establish and implement network policies. Policies are needed to address a variety of issues, including security, load balancing and bandwidth allocation. Many policies are directed to different types of users. For example, a corporation may have a policy that restricts outside contractors to certain resources on the network, while allowing unrestricted access by employees. An Internet service provider (ISP) may also have policies, such as to allow for different levels of service for different customers.

There are many products that allow the implementation of network policies on a user-by-user basis. One example is the MICROSOFT WINDOWS NT 4.0 brand operating system, which has a feature known as the RAS—REMOTE ACCESS SERVICE, which allows the implementation of policies that regulate remote access on a per-user basis. But enforcing network policies in such an ad hoc manner puts a tremendous burden on network administrators, since it requires them to get involved each time a user's account is established in order to apply the policy to that user. Thus, it can be seen that there is a need for a method of enforcing network policies that reduces the amount of involvement required by network administrators.

SUMMARY OF THE INVENTION

In accordance with this need, a method of enforcing a policy on a computer network is provided. The method is generally embodied in a policy server program that, in response to a user's attempt to access a network from a computer, evaluates one or more policy statements. Each policy statement expresses an implementation of a policy of the network, and is preferably expressed using the format If<condition(s)>then Profile The condition or conditions of a policy statement may include, but are not limited to: the group or groups to which a user belongs, the type of communication medium being over which the user is accessing the network, and, in the case of dial-up networking, the location into which the user is calling. The conditions may also be easily modified and combined using standard logical operators, such as AND, OR and NOT.

If a policy statement is evaluated to be true, a profile associated with the policy statement is applied to the user. A profile contains one or more actions that are to be taken with respect to the user. Actions include authorization parameters for determining whether a user is authorized access to a resource on the network, and communication parameters that are usable to configure a data path between the user's computer and the network. Multiple actions within a profile may be ordered in a hierarchy so that they are performed in a particular order. Groups of policy statements may also be ordered into hierarchies.

The ability to implement policies on a group basis relieves network administrators of the burden associated with previous systems. To enforce a policy on a group basis, the policy server program responds to a user log in attempt by determining the identity of the group or groups to which the user belongs. This is accomplished by referencing one or more group attributes contained in a user object located in a directory on the network. The user object and its group attributes are created when the user is added to the directory, while a policy statement for a group can be created at any time. This functional separation of placing a user in a group from creating a group policy minimizes the amount of involvement required by network administrators, as they will only be required to establish actions for each group, rather than for each user individually. The addition of an individual user to a group can be performed by a person with little or no networking expertise, and the actions established for the user's group or groups will automatically be applied. The method also allows actions to be overridden on a per user basis, if desired.

Additional features and advantages of the invention will be made apparent from the following detailed description of illustrative embodiments which proceeds with reference to the accompanying figures.

DETAILED DESCRIPTION OF THE INVENTION

Figure 1:
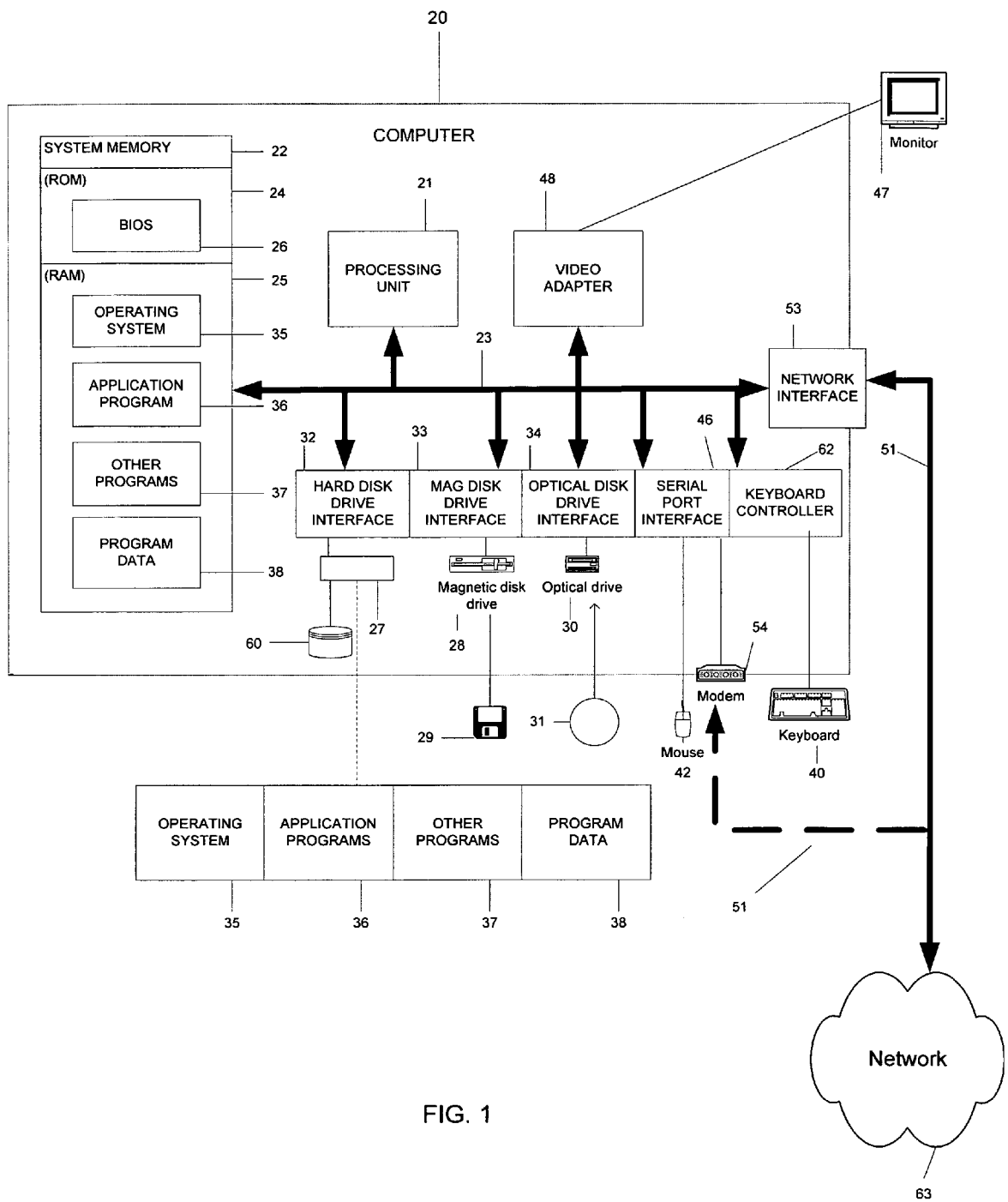
FIG. 1 is a block diagram illustrating an exemplary computer on which the present invention can reside.

Turning to the drawings, wherein like reference numerals refer to like elements, the invention is illustrated as being implemented in a suitable computing environment. Although not required, the invention will be described in the general context of computer-executable instructions, such as programs, being executed by a computer. Generally, programs include routines, other programs, objects, components, data structures, dynamic-linked libraries (DLLs), executable code, etc. that perform particular tasks or implement particular abstract data types. Moreover, those skilled in the art will appreciate that the invention may be practiced with other computer system configurations, including handheld devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, parts of a program may be located in both local and remote memory storage devices.

Figure 2:
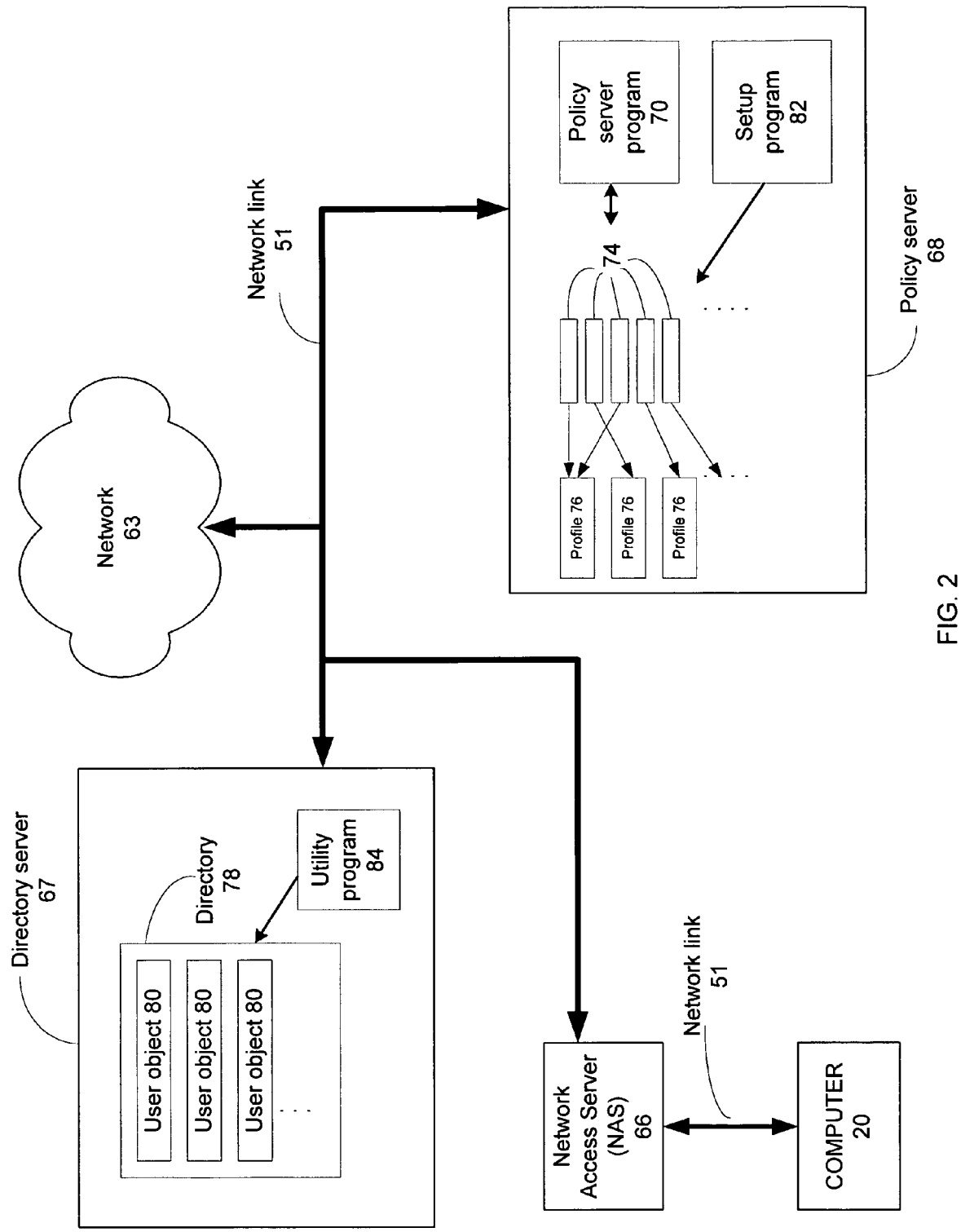
FIG. 2 is a block diagram illustrating an embodiment of the invention as implemented on an exemplary computer network.

With reference to FIGS. 1 and 2, an exemplary system for implementing the invention is shown. As best shown in FIG. 1, the system includes a general purpose computing device in the form of a conventional computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory may include read only memory (ROM) 24 and random access memory (RAM) 25. A basic input/output system (BIOS) 26, containing the basic routines that help to transfer information between elements within the computer 20, such as during start-up, may be stored in the ROM 24. The computer 20 may further include a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

If included in the computer 20, the hard disk drive 27, magnetic disk drive 28, and optical disk drive 30 may be connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, programs and other data for the computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of programs may be stored on the hard disk 60, magnetic disk 29, optical disk 31, ROM 24 or RAM 25, including an operating system 35, one or more applications programs 36, other programs 37, and program data 38. A user may enter commands and information into the computer 20 through input devices such as a keyboard 40, which is typically connected to the computer 20 via a keyboard controller 62, and a pointing device, such as a mouse 42. Other input devices (not shown) may include a microphone, joystick, game pad, satellite dish, scanner, or the like. Input devices as well as peripheral devices may be connected to the processing unit 21 through a serial port interface 46 that is coupled to the system bus, a parallel port, game port, universal serial bus (USB), 1394 bus, or other interfaces. A monitor 47 or other type of display device is also connected to the system bus 23 via an interface, such as a video adapter 48. In addition to the monitor, computers typically include other devices not shown, such as speakers and printers.

The computer 20 may operate in a networked environment using logical connections to one or more devices within a network 63, including another personal computer, a server, a router, a network PC, a peer device or other common network node. These devices typically include many or all of the elements described above relative to the computer 20. The logical connections depicted in FIGS. 1 and 2 include one or more network links 51, for which there are many possible implementations, including a local area network (LAN) link and a wide area network (WAN) link. Such networking links are commonplace in offices, enterprise-wide computer networks, intranets and the Internet. It will be appreciated that the network connections shown are exemplary and other means of establishing a data path between the computers may be used. When used in a LAN, the computer 20 may be connected to the network 63 through a network interface or adapter 53. When used in a WAN, the computer 20 typically includes a modem 54 or other means for establishing communications over the network link 51, as shown by the dashed line in FIG. 1. The network link 51 may also be created via conventional dial-up networking, the Internet, Digital Subscriber Line (DSL), Asynchronous Transfer Mode (ATM), Virtual Private Network (VPN) or any other conventional communication medium. The modem 54 may be connected to the system bus 23 via the serial port interface 46, and may be external or internal. In a networked environment, programs depicted relative to the computer 20, or portions thereof, may be stored on other devices within the network 63.

As best shown in FIG. 2, the network 63 includes a network access server (NAS) 66 that acts as a gateway for a computer 20 by creating a data path between the network 63 and the computer 20. The computer 20 communicates with the NAS 66 via a network link 51. It is understood that the physical separation between the computer 20 and the network 63 may range from very small to very great. The computer network 63 also includes a directory server 67 and a policy server 68 whose functions will be described below in further detail. The functions of the policy server 68, NAS 66, and the directory server 67 do not have to be performed by separate computers, and, in fact, some or all of the functions may be performed by a single computer. These functions are shown as being performed by different computers only for the sake of clarity. The architecture of the directory server 67, and policy server 68 includes many or all of the elements shown in FIG. 1 with respect to the computer 20.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Referring to FIG. 2, the invention is generally realized as a policy server program 70 which executes on the policy server 68 which in turn is linked for communication with the network access server (NAS) 66 over a network link 51. The NAS 66 provides the computer 20 with an access point to the network 63. After access is granted to the computer 20, the NAS 66 creates a data path between the computer 20 and the computer network 63. The policy server 68 then provides the NAS 66 with a profile 76 containing one or more actions for the NAS 66 to perform. Types of actions include, but are not limited to, authorization parameters, which the NAS 66 uses to determine whether to grant or deny access to network resources, as well as communication parameters which the NAS 66 uses to configure the data path. More specifically, the NAS 66 uses the communication parameters to control the characteristics of the data path, such as the bandwidth, speed, IP address, media, protocols used, and the like, in order to enforce the policies of the network. In order to obtain the appropriate set of actions, the policy server program 70 references one or more policy statements 74. Each policy statement 74 expresses an implementation of one or more policies for the network 63. In a preferred embodiment, a policy statement has the format If<condition(s)>then Profile If the conditions are satisfied, the policy server program 70 transmits the profile 76 associated with the policy statement to the NAS 66.

The computer network 63 also includes one or more instances of a directory 78 which is depicted in FIG. 2 as being stored on a directory server 67. In a preferred embodiment, the directory 78 is the "ACTIVE DIRECTORY" of the "MICROSOFT WINDOWS NT" or the "MICROSOFT WINDOWS 2000" brand operating systems. The directory 78 contains a set of user objects 80. Each user object 80 is a data structure that is associated with a recognized user of the network 63 and contains user attributes (or pointers thereto) that describe one or more characteristics of the user. The user attributes include one or more group attributes, which indicate the identity of the group or groups to which the user belongs. A "group" is a way of organizing users on a network and it is up to the discretion of the organization controlling the network 63 to determine how the groups are delineated. For example, employees in a corporation may be organized into groups according to their occupations, such as "secretary," "engineer," or "accountant." An ISP might organize users into groups according to their monthly pricing plans, such as "Flat_rate" or "hourly." Organizing users into groups is a well known technique in the "MICROSOFT WINDOWS 2000" brand operating system environment. The policy server program 70 references the user object to determine the group or groups to which users belong and, consequently, apply to the users. The user object 80 may also include the username and password of the user as well as an override attribute whose function will be described in further detail below.

Figure 3A:
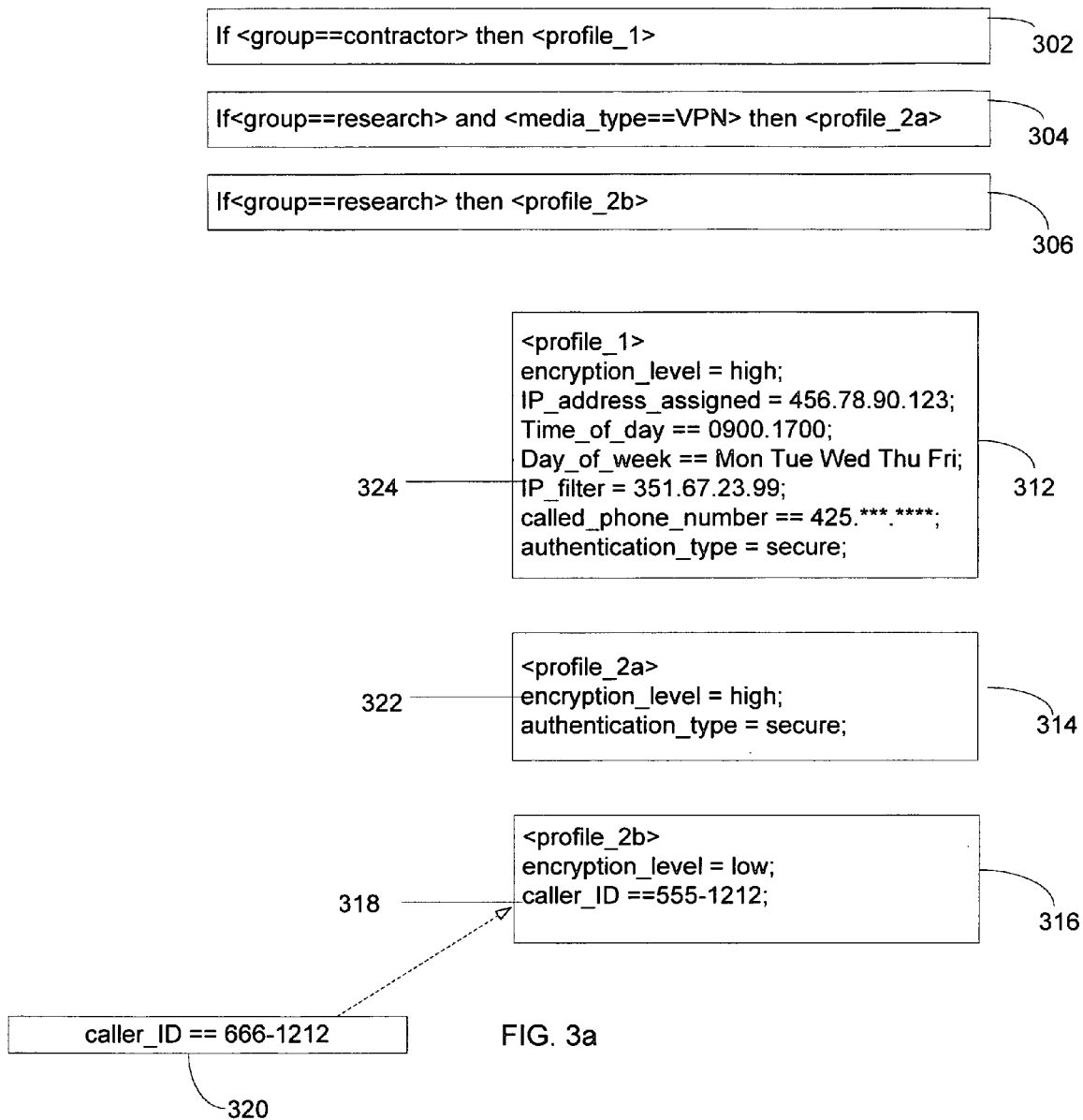
FIG. 3a shows an exemplary set of policy statements and corresponding profiles in accordance with the present invention.

Referring to FIG. 3a, an example of a set of policy statements 302–306 and corresponding profiles 312–316 that might be used in a corporation's internal network is shown. The conditions required for evaluating these policy statements include the group or groups to which a user belongs. For example, if a user belongs to the group "contractor," then the policy statement 302 will be evaluated as "true," and therefore apply to that user. Standard logical operators, such as AND, NOT and OR may also be used to create multiple conditions, as in the case of the policy statement 304, which combines the conditions "group" and "media_type." Each of the profiles 312–316 includes one or more actions. In the illustrated embodiment, the actions are implemented as authorization parameters that the NAS 66 uses to grant or deny access to resources on the network, and communication parameters that the NAS 66 uses to configure the data path between the computer 20 and the network 63. The actions illustrated in FIG. 3a include communication parameters such as "encryption_level"—how data travelling over the data path will be encrypted; "IP_address_assigned"—what IP address will be assigned to the user by the NAS 66; and authentication_type—what type of authentication will be used. The actions illustrated in FIG. 3a also include authorization parameters which must be logically "true" before access to one or more network resources is permitted. These include "Time_of_day"—what time of day access is permitted; "Day_of_week"—on what days of the week access is permitted; "caller_ID"—from what phone number (detected using caller ID) the user is permitted to call in order to use the remote access resources of the network; "IP_filter"—what servers the user is allowed to access; and "called_phone_number,"—to control access to the long distance resources of the network by restricting the area codes the user may call using, for example, Internet telephony. Other contemplated actions that are not shown in FIG. 3a include a callback parameter that indicates whether the NAS 66 is supposed to call a user back, and a callback number to indicate which number to use when calling the user back. Many other actions are possible, however.

One or more of the actions in a profile may be overridden using an override attribute contained in the user object of the user attempting to access the network. Such an override capability can be especially useful when the parameter being overridden is one for which user-to-user variation is expected. To override an action, the policy server program 70 adds the corresponding override attribute to the profile and deleting the action. For example, the action 318 of the profile 316 (FIG. 3a) is "caller_ID," which indicates to the NAS 66 the phone number from which the user is authorized to log in. This may initially be set up using a dummy phone number. If it is anticipated that a user will wish to have dial up access from home the user's object 80 (FIG. 2) may contain an override attribute 320 (FIG. 3a) having the user's home phone number. The policy server program 70 will replace the action 318 with the override attribute 320 prior to transmitting the profile 316 to the NAS 66. The phone number in the override attribute could be set by a human resources (HR) administrator when adding the new user to the network, as will be described below. Other examples of actions for which overriding may be useful include callback actions that indicate whether or not to call back a user and what number to use when calling back. Additionally, an override attribute may simply be added to a profile in cases where no corresponding action existed.

The policy server program 70 may also evaluate policies based on criteria other than groups. Referring to FIG. 3a, the policy statement 304 is evaluated based on the media type over which the user is attempting to access the network as well as the user's group. In FIG. 3a, the policy statements are arranged in a hierarchy, so that if the user belongs to the group "research," and the user is attempting to access the network 63 over a VPN, the policy statement 304 will be applied to the user, and the policy server program 70 will send the profile 314 to the NAS 66. The action 322 contained in the profile 314 will insure that the NAS 66 configures the data path between the computer 20 and the network 63 with a high level of encryption. This may be desirable when using a VPN, since VPN transmissions are generally sent via the Internet. If the user belongs to the group "research" and is not using a VPN, the policy statement 306 will be applied to the user, and the policy server program 70 will transmit the profile 316 to the NAS 66, thereby allowing the data path to be configured with a lower level of encryption.

The syntax used by the policy server program 70 is flexible enough to allow certain parameters to be used either as actions within a profile, or as conditions within a policy statement. For example, in the profile 312 of FIG. 3a, the action "Time_of_day==0900.1700" is an authorization parameter that tells the NAS 66 to determine whether the time of the user's login falls between 0900 and 1700, and if it does not, the NAS 66 is to deny access to the network. This authorization parameter may also be used as a condition for a policy statement as well. For example, "If<group==contractor>AND<Time_of_day==0900.1700>then Profile," is a policy statement that could tell the policy server program 70 to apply "Profile" if the user belongs to the group "contractor" and the login time is between 0900 and 1700. "Day_of_week" is similarly usable as either an action or a condition.

Figure 3B:
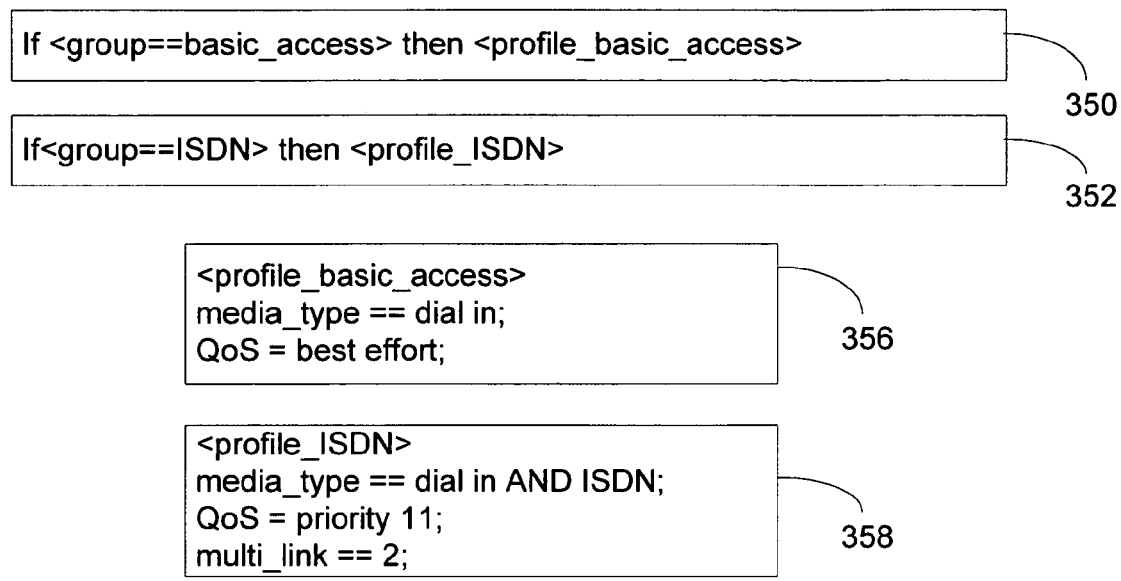
FIG. 3b shows another exemplary set of policy statements and corresponding profiles in accordance with the present invention.

Internet Service Providers (ISPs) may also use the policy server program 70 for enforcing network policies with respect to different levels of service. Referring to FIG. 3b, exemplary policy statements 350–352 and corresponding profiles 356–358 are shown. In this example, the policy statements 350–352 correspond to the two different levels of service, which are called "basic_access" and "ISDN" having different pricing schemes. As shown, the actions contained in the profiles 356–358 include the communication parameter "QoS"—which the policy server uses to determine the quality of service (QoS) of the network connection; and the authorization parameters "media_type"—reflecting the type of communications medium the user will be permitted to use in order to access the network, and "multi_link" indicating the number of maximum number of links the user will be permitted.

While not shown in FIG. 3b, the profiles 356–358 may also include an authorization parameter "number_called"—which the NAS 66 could use to determine whether the user is accessing the ISP network through the appropriate gateway. The "number_called" may be useful to restrict the geographical areas to which the user's service extends. For example, a user under the "basic_access" plan might only be allowed to access the ISP network using a gateway located in Seattle, in which case the field would contain a dial-up number for a NAS in Seattle. Alternatively, the "number_called" could be used as a condition in one of the policy statements of FIG. 3b. This would allow an ISP to give the user a profile based not only on the user's group but also based on the NAS being used for dial up.

Figure 4:
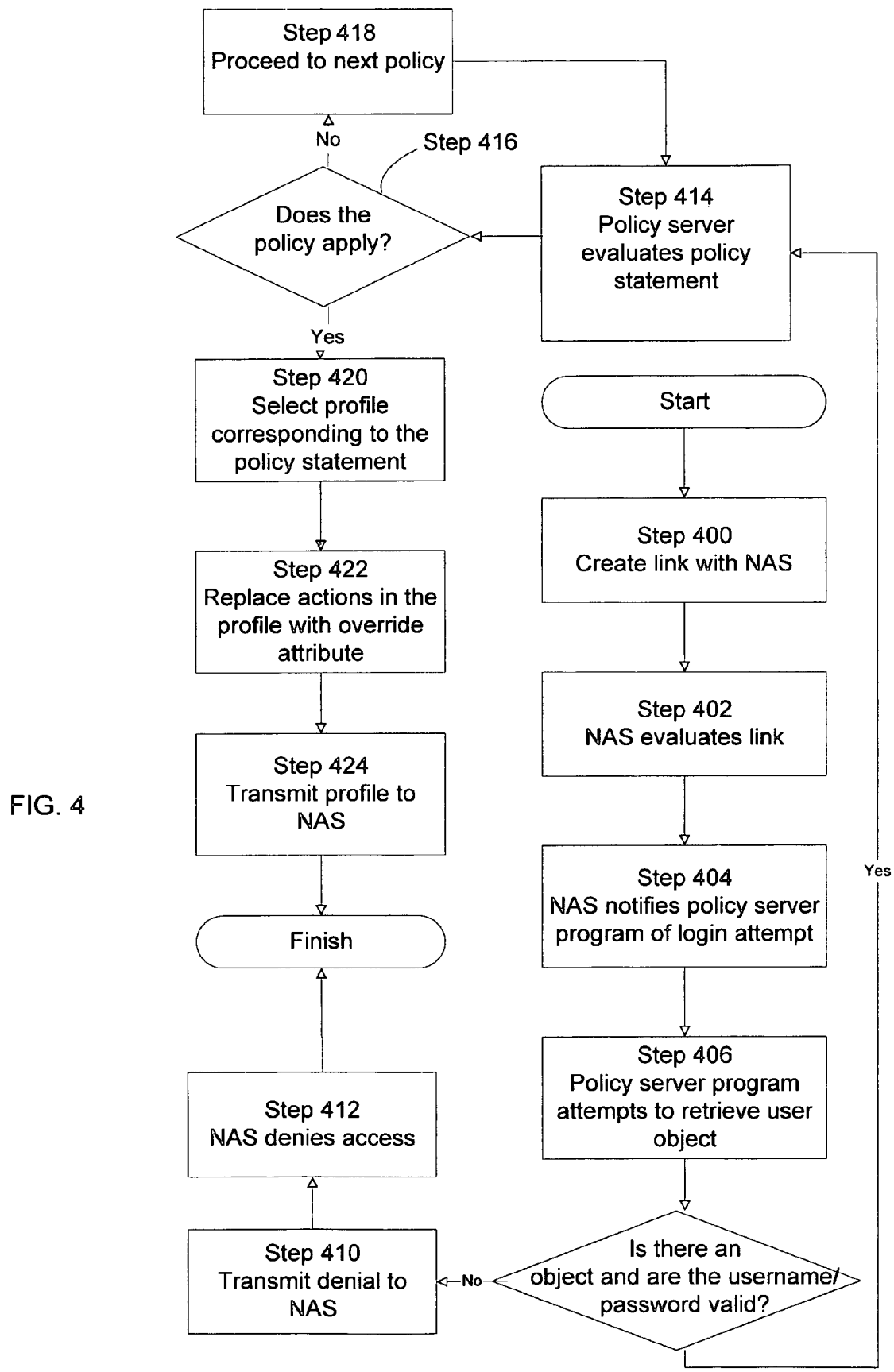
FIG. 4 is a flowchart generally depicting the procedure for responding to an attempt by a user to access a network in which the invention is implemented.

In order to process an attempt to access the network 63 from the computer 20 (FIG. 2), the procedure of the flowchart of FIG. 4 is followed. At step 400, the user at the computer 20 creates a link with the NAS 66 via telephone, cellular phone, internet, VPN, or other means and transmits a username and password to the NAS 66. The NAS 66 then conventionally evaluates the link between the computer 20 and the NAS 66 by determining characteristics thereof, such as the communications medium being used, which protocols are being implemented and the phone number from which the computer 20 is calling (in the case of dial-up access) at step 402. The NAS 66 then notifies the policy server 68 of the login attempt at step 404. In a preferred embodiment, this notification involves relaying the username and password received from the computer 20 as well as the detected link characteristics to the policy server 68. The policy server program 70 then attempts to retrieve the user object 80 corresponding to the user from the directory 78 on the directory server 67 at step 406. If the object is found, the policy server program 70 references the object to determine the username, password, and the identity of any groups to which the user belongs. If there is no object corresponding to that user, or if username/password combination submitted by the user is not correct, then the policy server program 70 transmits a denial message to the NAS 66 at step 410. The NAS 66 then denies the computer 20 access to the network at step 412. Additionally, the policy server program 70 may also determine whether the user should be admitted or denied access to the network 63 based on a group or groups to which the user belongs. For example, a blanket denial may be in effect for certain groups at certain times of day.

If the username and password are valid for the retrieved user object 80, the policy server program 70 then proceeds to steps 414–424, in which it evaluates the policy statements 74 based on a group to which the user belongs, and, if necessary, based on other policy conditions. The policy server program 70 may also use the characteristics of the link between the computer 20 and the NAS 66 which were received from the NAS 66 at step 404 to evaluate the policy statements 74. In a preferred embodiment, the policy statements 74 are evaluated in hierarchical order according to steps 414 through 418. Once the policy server program 70 finds a policy statement that applies to the user, the policy server program selects the profile 76 that corresponds to that policy statement at step 420. The policy server program 70 then modifies the selected profile by replacing one or more of the parameters contained in the profile with a corresponding override attribute (if there are any) at step 422. At step 424, the policy server program 70 transmits the profile to the NAS 66. The NAS 66 responds by granting or denying access to one or more network resources based on the authorization parameters and configuring the data path between the computer 20 and the network 63 as specified by the communication parameters of the selected profile 76.

Figure 5:
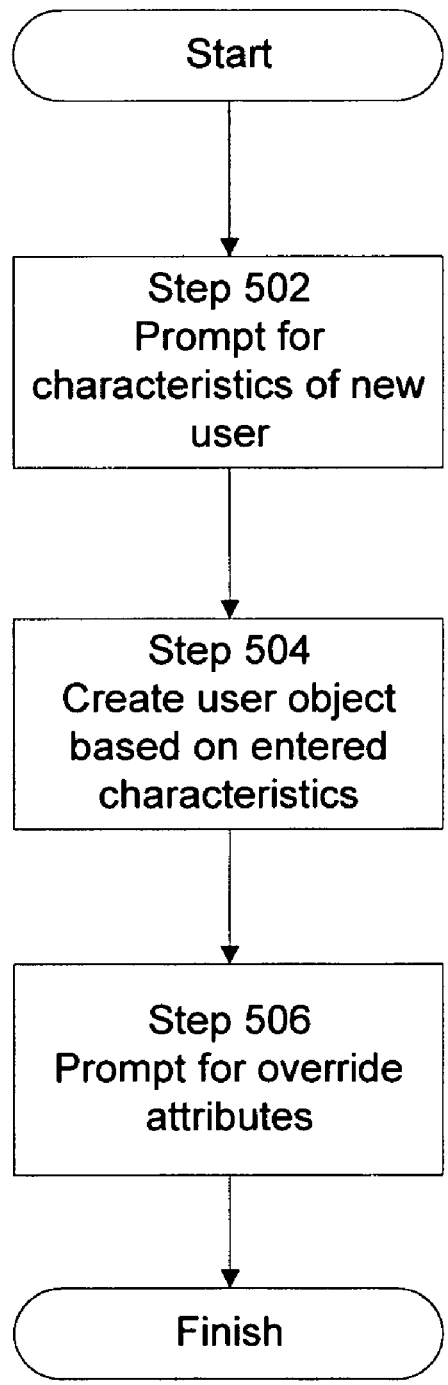
FIG. 5 is a flowchart generally depicting the procedure for adding a user to the directory in accordance with the present invention.

To cause the directory 78 to recognize a new user of the network 63, a utility program 84 (FIG. 2) may be executed at one of the servers of the network 63, such as the directory server 67, and perform the procedure of the flowchart of FIG. 5. At step 502, the utility program 84 presents a user-interface (UI) having a series of fields to be filled out by the individual. The fields may include characteristics of the new user, such as the new user's name, home telephone number, and the group or groups under which the new user will be categorized. At step 504, the setup program receives the field entries and creates a user object 80 for the new user in the directory 78. The group attribute of parameters for the created user object will correspond to the group or groups under which the new user is categorized. As described above, the group attribute or attributes are usable by the policy server program 70 to determine which profile to send to the NAS 66. In one embodiment of the utility program 84, the individual executing the utility program 84 is given the option to specify override attributes that are to be applied to the new user at step 506.

To add a new employee to a hypothetical corporate network, for example, a human resources (HR) administrator launches the setup program 84 at the directory server 67. If the new person is an outside contractor working for the research group, the HR administrator enters "research" and "contractor" in the "groups" field at step 502. The utility program 84 then creates an object 80 for that person in the directory 78. The new user object 80 now has the group attributes of "research" and "contractor." After the user attempts to access the network 63 via the NAS 66, the policy server program 70 (step 400 of FIG. 4), the policy server program 70 retrieves the user's object 80 and determines that the user belongs to the groups "research" and "contractor" (step 406). Assuming that the policy statements and profiles of FIG. 3a apply, the policy server program 70 then searches the policy statements 302–306 (steps 414–418). Since the policy statement 302 is the first for which the conditions are met, the policy server program applies the policy statement 302 to the user. The policy server program 70 retrieves the profile 312 and transmits it to the NAS 66. The NAS 66 then grants the user access only to resources allowed by the filter settings of the action 324. Note that even though the user is also a member of the group "research," the policy 302 takes precedence over the policy 306.

Figure 6:
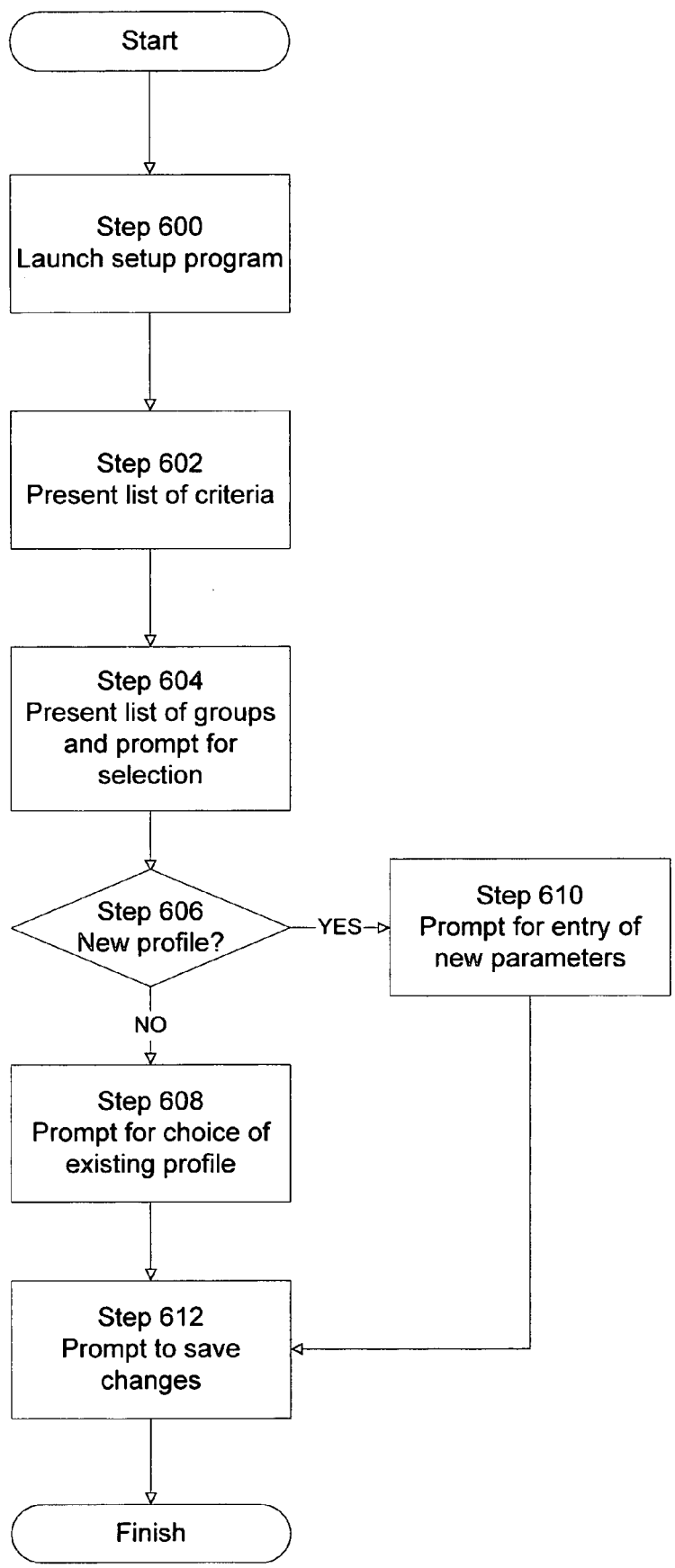
FIG. 6 is a flowchart generally depicting the procedure for creating a policy statement and a profile in accordance with the present invention.

Referring to FIG. 6, an embodiment of a procedure that may be carried out by a setup program 82 (FIG. 2) to create policy statements and profiles on the policy server 68 is shown. At step 600, the individual responsible for enabling the network's access policy, who will be referred to as a network administrator in this example, launches the setup program 82 at the policy server 68. Through a user interface, the setup program 82 presents the network administrator a list of criteria on which a policy statement may be based at step 602. To create a group-based policy, the network administrator chooses the criteria "group." The setup program 82 then obtains a list of groups from the directory 78 and presents the list to the network administrator. At step 604, the network administrator selects a group and the logical operators from which to create the conditions for a policy statement. The network administrator then has the option of creating compound conditions with other groups and with non-group criteria. For example, the network administrator may wish to have the conditions such as:

If<(group==employee) AND (group< >legal)>then<profile>
If<(group==premium) OR (media_type==ISDN)>then<profile>

At step 606, the network administrator is prompted to either associate an existing profile with the policy statement or to create a new profile for the policy statement. If the network administrator chooses to use an existing policy statement, then the setup program 82 the administrator chooses from a list of available profiles at step 608. At step 612, the network administrator is prompted to save the changes and the process ends. If the network administrator chose to create a new profile at step 606, the flow branches to step 610, in which the administrator is prompted to enter the parameters desired for the new profile.

In view of the many possible embodiments to which the principals of this invention may be applied, it should be recognized that the embodiment described herein with respect to the drawing figures is meant to be illustrative only and should not be taken as limiting the scope of the invention. For example, those of skill in the art will recognize that the elements of the illustrated embodiment shown in software may be implemented in hardware and vice versa or that the illustrated embodiment can be modified in arrangement and detail without departing from the spirit of the invention. Furthermore, it is understood that some of the steps illustrated in flowcharts may be rearranged in obvious respects without departing from the scope of the invention. Therefore, the invention as described herein contemplates all such embodiments as may come within the scope of the following claims and equivalents thereof.

We claim:

1. A method for enforcing a selected policy from a set of polices maintained by a policy server to be applied to a user interconnected to a network through a communication path, wherein the network includes a gateway and one or more resources, comprising:

receiving, by the gateway, a request from the user to access the one or more resources on the network;

selecting a user object from a plurality of stored objects, wherein the user object corresponds to the user and includes a set of attributes comprising a group to which the user belongs, a user name, password, and an override attribute;

determining whether to grant or deny access to the network based upon the user name and password;

identifying a profile that applies to the user based on the set of attributes, including the group to which the user belongs, wherein the profile includes an authorization parameter and a communication parameter;

determining, by the gateway, whether to grant or deny access to the resources on the network based upon the authorization parameter; and configuring the communication path, including setting quality of service (QOS) based upon the communication parameter.

2. The method of claim 1, wherein the network is a virtual network.

3. The method of claim 1, further comprising:

determining a characteristic of the communication path between the user and the gateway; and determining, at the gateway, whether to grant or deny access to the one or more resources on the network based on the determined characteristic.

4. The method of claim 3, wherein the characteristic of the communication path is a call-back number.

5. The method of claim 3, wherein the characteristic is a medium type.

6. The method of claim 1, wherein the gateway is interposed between the user and each of the resources on the network.

7. The method of claim 1, further comprising:

replacing the authorization parameter with the override attribute.

8. The method of claim 1, further comprising:

replacing the communication parameter with the override attribute.

9. The method of claim 1, wherein the communication parameter includes an authentication type and the step of configuring the communication path comprises setting the authentication type to be applied to the user.

10. The method of claim 1, wherein the step of configuring the communication path comprises setting a bandwidth.

11. The method of claim 1, wherein the step of configuring the communication path comprises establishing a network address assigned to the user.

12. The method of claim 1, wherein the step of configuring the communication path comprises establishing an encryption level to be applied to communications between the user and the network.

13. The method of claim 1, wherein the authorization parameter represents a time of day during which the user is permitted to access the network.

14. The method of claim 1, wherein the authorization parameter represents a phone number from which the user is permitted to call and access the network.

15. A computer-readable medium having computer-readable instructions for a method for enforcing a selected policy from a set of polices maintained by a policy server to be applied to a user interconnected to a network through a communication path, wherein the network includes a gateway and one or more resources, comprising:

receiving, by the gateway, a request from the user to access the one or more resources on the network;

selecting a user object from a plurality of stored objects, wherein the user object corresponds to the user and includes a set of attributes comprising a group to which the user belongs, a user name, password, and an override attribute;

determining whether to grant or deny access to the network based upon the user name and password;

identifying a profile that applies to the user based on the set of attributes, including the group to which the user belongs, wherein the profile includes an authorization parameter and a communication parameter;

determining, by the gateway, whether to grant or deny access to the resources on the network based upon the authorization parameter; and configuring the communication path, including setting quality of service (QOS), based upon the communication parameter.

16. The computer-readable medium of claim 15, wherein the network is a virtual network.

17. The computer-readable medium of claim 15, further comprising:

determining a characteristic of the communication path between the user and the gateway; and determining, at the gateway, whether to grant or deny access to the one or more resources on the network based upon the determined characteristic.

18. The computer-readable medium of claim 15, further comprising:

replacing the authorization parameter with the override attribute.

19. The computer-readable medium of claim 15, further comprising:

replacing the communication parameter with the override attribute.

20. The computer-readable medium of claim 15, wherein the communication parameter includes an authentication type and the step of configuring the communication path comprises setting the authentication type to be applied to the user.

21. The computer-readable medium of claim 15, wherein the step of configuring the communication path comprises setting a bandwidth.

22. The computer-readable medium of claim 15, wherein the step of configuring the communication path comprises establishing a network address assigned to the user.

23. The computer-readable medium of claim 15, wherein the step of configuring the communication path comprises establishing an encryption level to be applied to communications between the user and the network.

* * * * *